(12) United States Patent
Enguehard et al.

(10) Patent No.: US 10,999,159 B2
(45) Date of Patent: May 4, 2021

(54) SYSTEM AND METHOD OF DETECTING APPLICATION AFFINITY USING NETWORK TELEMETRY

(71) Applicant: Cisco Technology, Inc., San Jose, CA (US)

(72) Inventors: Marcel Paul Sosthène Enguehard, Paris (FR); Yoann Desmouceaux, Paris (FR); Jacques Olivier Samain, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/375,798

(22) Filed: Apr. 4, 2019

(65) Prior Publication Data

US 2020/0322229 A1  Oct. 8, 2020

(51) Int. Cl.
  *G06F 15/16* (2006.01)
  *G06F 9/54* (2006.01)
  *H04L 12/24* (2006.01)
  *H04L 12/26* (2006.01)

(52) U.S. Cl.
  CPC ............. *H04L 41/50* (2013.01); *H04L 43/08* (2013.01)

(58) Field of Classification Search
  CPC ...................................................... H04L 41/50
  USPC ....................................................... 709/224
  See application file for complete search history.

(56) References Cited

U.S. PATENT DOCUMENTS

| 7,707,122 B2* | 4/2010 | Hull ....................... G06Q 50/01 705/319 |
| 8,600,920 B2 | 12/2013 | Flynn et al. |
| 8,782,242 B2* | 7/2014 | Ahmad ............... G06F 9/45558 709/226 |
| 9,301,026 B2 | 3/2016 | Srinivas et al. |
| 9,946,527 B2* | 4/2018 | Sharma .................... G06F 8/60 |
| 10,084,648 B2 | 9/2018 | Franke et al. |
| 10,129,342 B2* | 11/2018 | El Defrawy ............ H04L 41/22 |
| 2008/0295094 A1* | 11/2008 | Korupolu .............. G06F 9/5066 718/1 |

(Continued)

OTHER PUBLICATIONS

Landi et al., "An Application-Aware SDN Controller for Hybrid Optical-Electric DC Networks," researchgate.net, Apr. 23, 2017, pp. 131-136.

(Continued)

*Primary Examiner* — Hamza N Algibhah
(74) *Attorney, Agent, or Firm* — Polsinelli PC

(57) ABSTRACT

Systems, methods, and computer-readable storage media are provided for using service affinity for application placement. A method includes evaluating, using a netflow module within an orchestrator, flows coming in and out of deployed services within a multi-node network to yield an evaluation. Based on the evaluation, the method includes determining an affinity between respective services of the deployed services to yield a traffic matrix and, based on the traffic matrix, at a placement module, determining on which nodes within the multi-node network to place one or more applications. Determining the affinity can be performed at at least a first level and a second level. The first level can include an individual container or virtual machine level and the second level can include a service description level.

15 Claims, 3 Drawing Sheets

(56) References Cited

U.S. PATENT DOCUMENTS

| | | | |
|---|---|---|---|
| 2009/0161673 A1* | 6/2009 | Breslau | H04L 12/1868 370/390 |
| 2010/0082408 A1* | 4/2010 | Berthaud | G06Q 10/02 705/7.29 |
| 2010/0127921 A1* | 5/2010 | Chen | G06Q 50/01 705/319 |
| 2012/0102190 A1 | 4/2012 | Durham et al. | |
| 2012/0191843 A1* | 7/2012 | Ding | H04L 43/0876 709/224 |
| 2013/0117847 A1* | 5/2013 | Friedman | H04L 63/102 726/22 |
| 2014/0278326 A1* | 9/2014 | Sharma | G06F 8/60 703/13 |
| 2014/0372630 A1* | 12/2014 | Bostick | G06F 3/0659 710/5 |
| 2015/0222508 A1* | 8/2015 | Kruglick | H04L 41/142 709/224 |
| 2016/0147552 A1* | 5/2016 | Zhang | G06F 9/45558 718/1 |
| 2016/0226789 A1* | 8/2016 | Sundararajan | H04L 67/1008 |
| 2016/0371134 A1* | 12/2016 | Raghavendra | G06F 11/0721 |
| 2017/0031623 A1* | 2/2017 | Gong | G06F 11/2033 |
| 2017/0302542 A1 | 10/2017 | Ruan et al. | |
| 2018/0026909 A1* | 1/2018 | Gan | H04L 47/782 709/226 |
| 2018/0176261 A1* | 6/2018 | Bansal | H04L 41/0893 |
| 2018/0248901 A1* | 8/2018 | Rieke | H04L 63/1433 |
| 2018/0351876 A1* | 12/2018 | Ren | H04L 47/808 |
| 2019/0028376 A1* | 1/2019 | Ganapathy | H04L 43/12 |

OTHER PUBLICATIONS

Bakopoulos et al., "NEPHELE: An End-to-End Scalable and Dynamically Reconfigurable Optical Architecture for Application-Aware SDN Cloud Data Centers," ieee.org Feb. 13, 2018, pp. 178-188.

Karve et al., "Dynamic Placement for Clustered Web Applications," WWW2006, May 22-26, 2006, Edinburgh, IL, pp. 1-10.

Sonnek et al., "Starling: Minimizing Communication Overhead in Virtualized Computing Platforms Using Decentralized Affinity-Aware Migration," IEEE, 2010 39th International Conference on Parallel Processing, pp. 1-10.

International Search Report and Written Opinion from the International Searching Authority, dated Jun. 23, 2020, 12 pages, for corresponding International Patent Application No. PCT/US2020/026361.

\* cited by examiner

SYSTEM AND METHOD OF DETECTING APPLICATION AFFINITY USING NETWORK TELEMETRY

TECHNICAL FIELD

The present technology pertains to gathering telemetry by registering data associated with flows between deployed services to learn about the affinity between services at an individual container or virtual machine level or at the service description level. The learned affinity can be used for application placement.

BACKGROUND

Research has been done on application placement based on application affinity such as which applications are collaborating with one another. In most of the prior art, some operator is required to know about collaboration patterns between applications and to encode the collaboration patterns and optimization framework. Realistically, this requirement is problematic as communication patterns may not be known in advance and change over time.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Figure 1A:
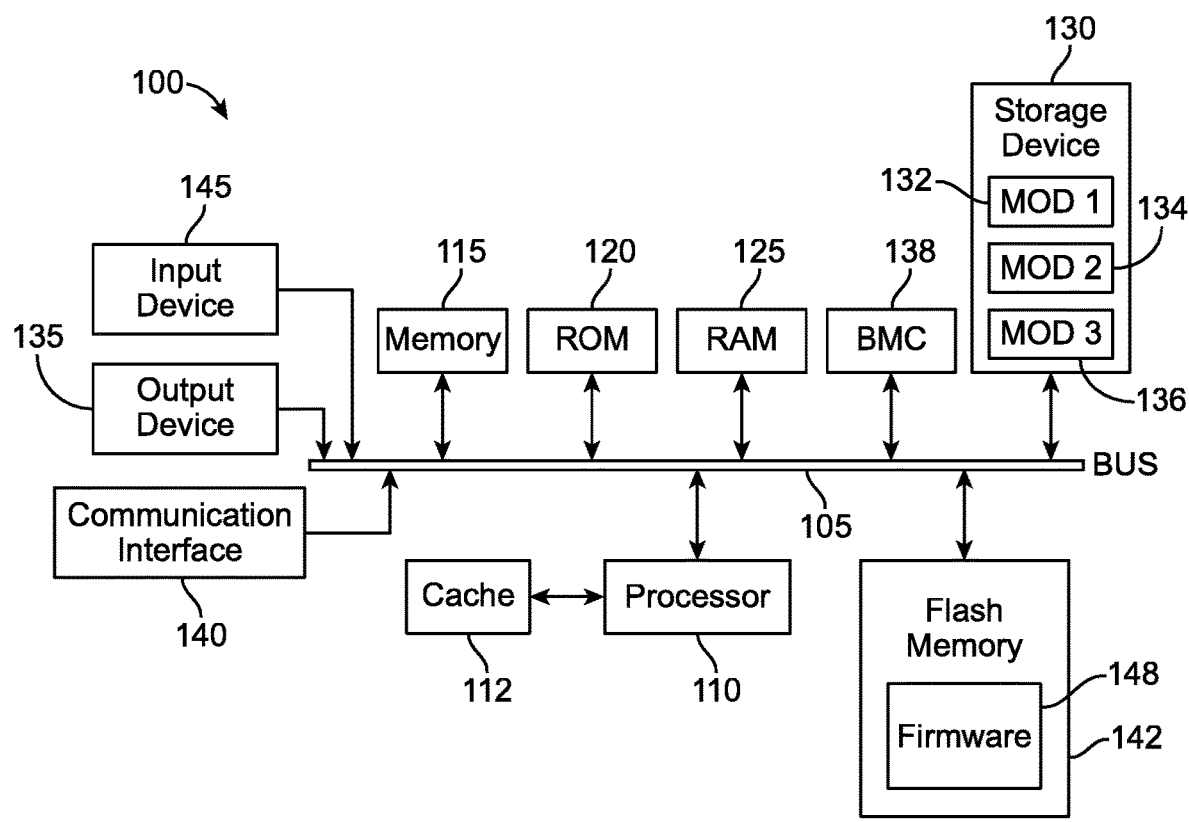
FIGS. 1A and 1B illustrates example system embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

There is a need in the art for addressing the issue of detecting application affinity in a more realistic and efficient way. The present disclosure provides an approach of using network telemetry, typically netflow, in the orchestration system to detect interdependent services. This data can be used by an existing optimization framework to make application placement decisions.

Overview

The present disclosure cover systems, methods and computer readable media related to learning about affinities between services.

In one example, a method can include evaluating, using a netflow module within an orchestrator, flows coming in and out of deployed services within a multi-node network to yield an evaluation. Based the evaluation, the method includes determining an affinity between respective services of the deployed services to yield a traffic matrix and, based on the traffic matrix, at a placement module, determining on which nodes within the multi-node network to place one or more applications. Determining the affinity can be performed at at least a first level and a second level. The first level can include an individual container or virtual machine level and the second level can include a service description level. The traffic matrix can include a weighted graph representing inter-service dependencies.

DETAILED DESCRIPTION

A brief introductory description of example systems and environments for executing the activities disclosed herein are first disclosed.

The following is an example method. A method includes evaluating, utilizing a netflow module within an orchestrator, flows coming in and out of deployed services within a multi-node network to yield an evaluation and, based the evaluation, determining an affinity between respective services of the deployed services to yield a traffic matrix. The method further includes, based on the traffic matrix, at a placement module, determining on which nodes within the multi-node network to place one or more services.

Determining the affinity can be performed at at least a first level and a second level. The first level, for example, can include an individual container or virtual machine level and the second level can include a service description level. In one aspect, traffic matrix can include a weighted graph representing inter-service dependencies. In another aspect, determining on which nodes within the multi-node network to place one or more applications can further include migrating a service after placement based on the evaluation.

The method can further include placing a first service and a second service on a same node based on an evaluation that indicates a strong affinity between the first service and the second service. In one aspect, the placement module can determine on which nodes within the multi-node network to place one or more services further based on usage metrics. The usage metrics can include one or more of processor usage, memory usage and bandwidth data. The placement module can further determine on which nodes within the multi-node network to place one or more services according to an application of one or more of a linear solver, a genetic algorithm, a machine learning algorithm, a predictive algorithm, and historical information.

Another aspect of this disclosure includes a system. The system can include a processor and a computer-readable device storing instructions which, when executed by the processor, cause the processor to perform operations including evaluating, utilizing a netflow module within an orchestrator, flows coming in and out of deployed services within a multi-node network to yield an evaluation and, based the evaluation, determining an affinity between respective services of the deployed services to yield a traffic matrix and, based on the traffic matrix, at a placement module, determining on which nodes within the multi-node network to place one or more services.

Another aspect of this disclosure includes a computer-readable device that stores instructions which, when executed by a processor, cause the processor to perform operations including evaluating, utilizing a netflow module within an orchestrator, flows coming in and out of deployed services within a multi-node network to yield an evaluation and, based on the evaluation, determining an affinity between respective services of the deployed services to yield a traffic matrix and, based on the traffic matrix, at a placement module, determining on which nodes within the multi-node network to place one or more services.

Figure 1B:
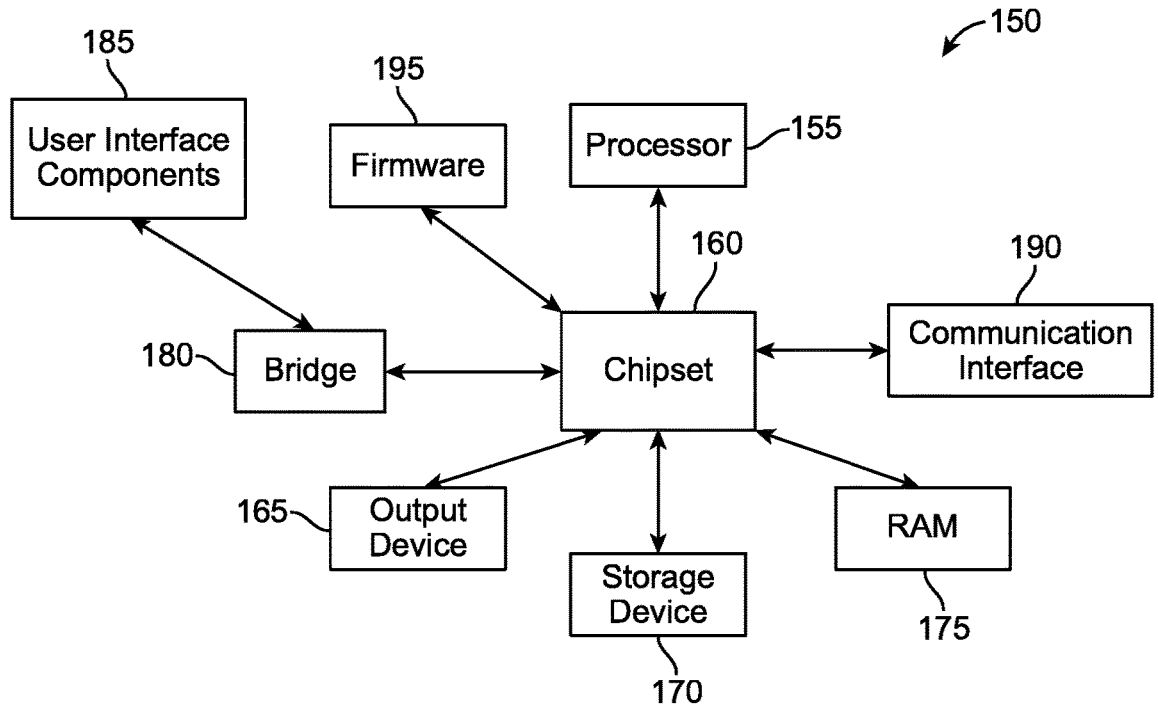

FIGS. 1A and 1B illustrate example system embodiments. The more appropriate embodiment will be apparent to those of ordinary skill in the art when practicing the present technology. Persons of ordinary skill in the art will also readily appreciate that other system embodiments are possible.

FIG. 1A illustrates a system bus computing system architecture 100 wherein the components of the system are in electrical communication with each other using a bus 105. Example system 100 includes a processing unit (CPU or processor) 110 and a system bus 105 that couples various system components including the system memory 115, such as read only memory (ROM) 120 and random access memory (RAM) 125, to the processor 110. The system 100 can include a cache 112 of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules can control or be configured to control the processor 110 to perform various actions. Other system memory 115 may be available for use as well. The memory 115 can include multiple different types of memory with different performance characteristics. The processor 110 can include any general purpose processor and a hardware module or software module, such as module 1 132, module 2 134, and module 3 136 stored in storage device 130, configured to control the processor 110 as well as a special-purpose processor where software instructions are incorporated into the actual processor design. The processor 110 may essentially be a completely self-contained computing system, containing multiple cores or processors, a bus, memory controller, cache, etc. A multi-core processor may be symmetric or asymmetric.

To enable user interaction with the system 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the system 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software modules 132, 134, 136 for controlling the processor 110. Other hardware or software modules are contemplated. The storage device 130 can be connected to the system bus 105. In one aspect, a hardware module that performs a particular function can include the software component stored in a computer-readable medium in connection with the necessary hardware components, such as the processor 110, bus 105, display 135, and so forth, to carry out the function.

The BMC (baseboard management controller) 138 can be a specialized microcontroller or processor on the system 100. In some cases, the BMC 138 can be part of an Intelligent Platform Management Interface (IPMI). Moreover, in some cases, the BMC 138 can be embedded on a motherboard or main circuit board of the system 100. The BMC 138 can manage the interface between system management software and platform hardware. Different types of sensors built into the system 100 can report to the BMC 138 on parameters such as temperature, cooling fan speeds, power status, operating system (OS) status, and so forth. The BMC 138 can monitor the sensors and send alerts to an administrator via a network interface, such as communication interface 140, if any of the parameters do not stay within preset limits or thresholds indicating a potential failure or error of the system 100. The administrator can also remotely communicate with the BMC 138 to take some corrective action, such as resetting or power cycling the system 100, to restore functionality.

Flash memory 142 can be an electronic non-volatile computer storage medium or chip which can be used by the system 100 for storage and/or data transfer. The flash memory 142 can be electrically erased and/or reprogrammed. Flash memory 142 can, for example, include erasable programmable read-only memory (EPROM), electrically erasable programmable read-only memory (EEPROM), ROM, NVRAM, or complementary metal-oxide semiconductor (CMOS). The flash memory 142 can store the firmware 148 executed by the system 100 when the system 100 is first powered on, along with a set of configurations specified for the firmware 148. The flash memory 142 can also store configurations used by the firmware 148.

The firmware 148 can include a Basic Input/Output System or its successors or equivalents, such as an Extensible Firmware Interface (EFI) or Unified Extensible Firmware Interface (UEFI). The firmware 148 can be loaded and executed as a sequence program each time the system 100 is started. The firmware 148 can recognize, initialize, and test hardware present in the system 100 based on the set of configurations. The firmware 148 can perform a self-test, such as a Power-on-Self-Test (POST), on the system 100. This self-test can test functionality of various hardware components such as hard disk drives, optical reading devices, cooling devices, memory modules, expansion cards and the like. The firmware 148 can address and allocate an area in the memory 115, ROM 120, RAM 125, and/or storage device 130, to store an operating system (OS). The firmware 148 can load a boot loader and/or OS, and give control of the system 100 to the OS.

The firmware 148 of the system 100 can include a firmware configuration that defines how the firmware 148 controls various hardware components in the system 100. The firmware configuration can determine the order in which the various hardware components in the system 100 are started. The firmware 148 can provide an interface, such as an UEFI, that allows a variety of different parameters to be set, which can be different from parameters in a firmware default configuration. For example, a user (e.g., an administrator) can use the firmware 148 to specify clock and bus speeds, define what peripherals are attached to the system 100, set monitoring of health (e.g., fan speeds and CPU temperature limits), and/or provide a variety of other parameters that affect overall performance and power usage of the system 100.

While firmware 148 is illustrated as being stored in the flash memory 142, one of ordinary skill in the art will readily recognize that the firmware 148 can be stored in other memory components, such as memory 115 or ROM 120. However, firmware 148 is illustrated as being stored in the flash memory 142 as a non-limiting example for explanation purposes.

FIG. 1B illustrates an example computer system 150 having a chipset architecture that can be used in executing the described method(s) or operations, and generating and displaying a graphical user interface (GUI). Computer system 150 can include computer hardware, software, and firmware that can be used to implement the disclosed technology. System 150 can include a processor 155, representative of any number of physically and/or logically distinct resources capable of executing software, firmware, and hardware configured to perform identified computations. Processor 155 can communicate with a chipset 160 that can control input to and output from processor 155. In this example, chipset 160 outputs information to output 165, such as a display, and can read and write information to storage device 170, which can include magnetic media, and solid state media, for example. Chipset 160 can also read data from and write data to RAM 175. A bridge 180 for interfacing with a variety of user interface components 185 can be provided for interfacing with chipset 160. Such user interface components 185 can include a keyboard, a microphone, touch detection and processing circuitry, a pointing device, such as a mouse, and so on. In general, inputs to system 150 can come from any of a variety of sources, machine generated and/or human generated.

Chipset 160 can also interface with one or more communication interfaces 190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 155 analyzing data stored in storage 170 or 175. Further, the machine can receive inputs from a user via user interface components 185 and execute appropriate functions, such as browsing functions by interpreting these inputs using processor 155.

Moreover, chipset 160 can also communicate with firmware 195, which can be executed by the computer system 150 when powering on. The firmware 195 can recognize, initialize, and test hardware present in the computer system 150 based on a set of firmware configurations. The firmware 195 can perform a self-test, such as a POST, on the system 150. The self-test can test functionality of the various hardware components 155-190. The firmware 195 can address and allocate an area in the memory 175 to store an OS. The firmware 195 can load a boot loader and/or OS, and give control of the system 150 to the OS. In some cases, the firmware 195 can communicate with the hardware components 155-190. Here, the firmware 195 can communicate with the hardware components 155 and 165-190 through the chipset 160 and/or through one or more other components. In some cases, the firmware 195 can communicate directly with the hardware components 155-190.

It can be appreciated that example systems 100 and 150 can have more than one processor 110 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described herein.

Figure 2:
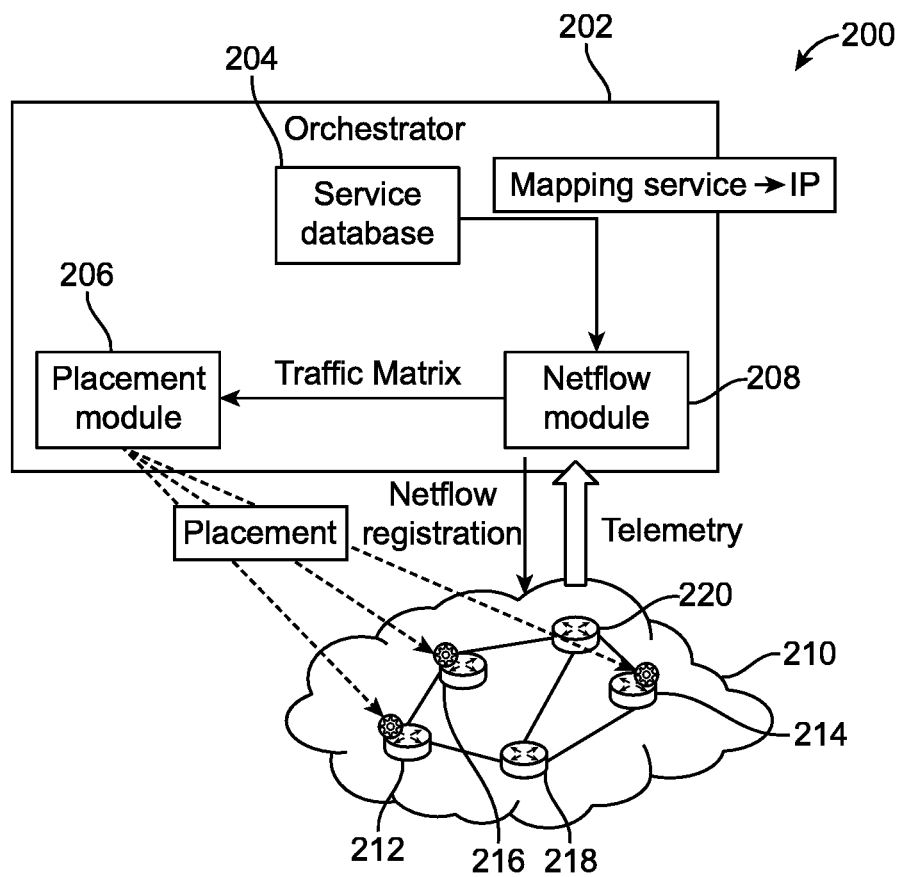
FIG. 2 illustrates a network environment in which the disclosed approach is applicable.

FIG. 2 illustrates a network within which the present principles can apply to provide the ability to learn about affinity between services. The network 200 generally includes an orchestrator 202 having a service database 204, a placement module 206 and a netflow module 308. The netflow module 208 is used to register notifications for flows coming in and out of various deployed services within a network 210. An example orchestrator 202 can be a Cisco Network Services Orchestrator that provides automating services across a traditional and virtualized network to add, change and delete services without disrupting an overall service delivery. The orchestrator 202 can also ensure that services are delivered in real time. For example, the orchestrator 202 can manage the overall lifecycle of a virtual service such as the creation, modification, repair, migration, and deletion of virtualized services. This can be done on demand or as requested by a client. The present disclosure can add to the feature performed according to the processes disclosed herein for improving service placement as part of the service lifecycle. Other aspects of the service life cycle like migration and other modifications applicable to this disclosure can be implemented.

The netflow module 208 has a goal to derive telemetry from the network 210 to measure serviced-to-service communications. For each of the deployed services, the orchestrator 202 gathers corresponding IP addresses relative to each service. It then registers, to the netflow module 208, notifications for flows involving these particular IP addresses. The netflow module 208 can store telemetry for flows where both ends are deployed services.

The netflow module 208 can include an affinity derivation component or module which is used to build a model for service affinity using the netflow data. For example, a profile can be modeled as an oriented or weighted graph, connecting services that are communicating with one another. Depending on the desired affinity granularity, the nodes of the graph can be either individual containers or virtual machines or services. Since the telemetry data comes from the netflow notifications, the system may require some data aggregation at a controller before injecting it into the graph. The vertices of such a graph can be weighted with the average throughput of the service to service or container to container flow over time.

The resulting component can be termed a traffic matrix in which each cell (i, j) is the weight of the graph edge from i to j. In addition to simply storing the average or moving average of pair wise traffic over time, higher orders statistics can be kept and used to deduce whether observed traffic between two services corresponds to singular diversity spikes or if important background traffic is exchanged between the services thus indicating a strong affinity. The observed traffic can be used to evaluate or ascertain the affinity between services which can then be fit into an optimization module.

An optimization module can be included within or as part of the placement module 206. A goal of the optimization module is to increase the quality of service and save resources by optimizing service placement, taking into account services affinity. Optimization in this case does not necessarily mean optimal in the purest sense but in the sense of improving the placement of services relative to a traditional placement mechanism. The optimization module will aim of placing services with strong affinity on the same node. While the affinity derived from the traffic matrix described above is one of the inputs to this module, the module can also take as input usage metrics such as central processor unit usage, memory, bandwidth use, or other metrics, collected on the machines. The placement problem is formulated as an optimization problem solving a linear solver. Other methods for solving placement issues can include one or more of genetic algorithms, machine learning, a predictive algorithm, and historical information and so forth.

In one aspect, the traffic matrix is not used by a controller to react to network events, such as congestion. Rather, the traffic matrix can be used to learn about affinity between services and therefore optimize their placement or migrate services to new locations after deployment based on data gleaned from the traffic matrix.

Figure 3:
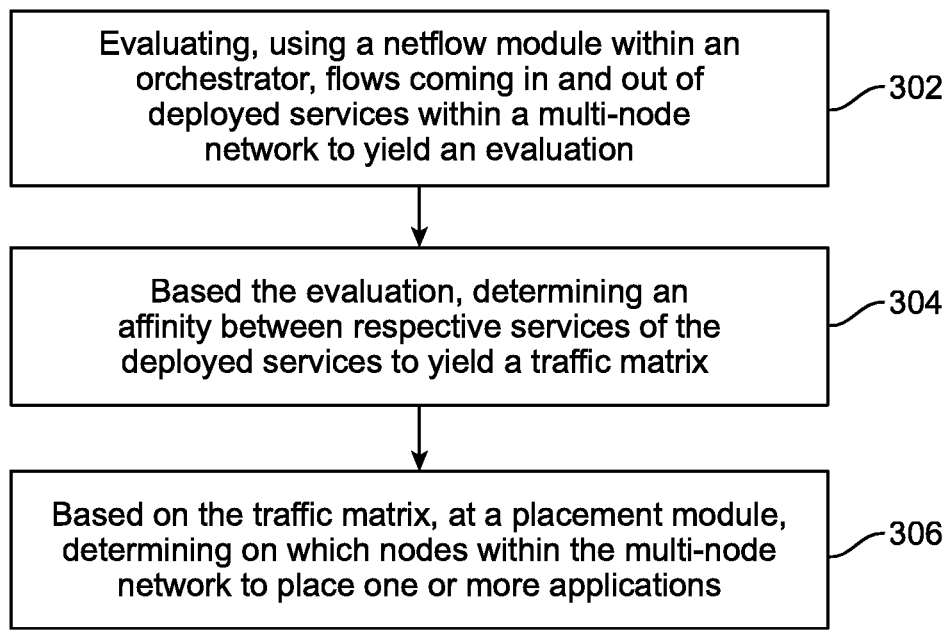
FIG. 3 illustrates a method embodiment.

FIG. 3 illustrates a method embodiment. The method includes evaluating, using a netflow module within an orchestrator, flows coming in and out of deployed services within a multi-node network to yield an evaluation (302). Based on the evaluation, the method includes determining an affinity between respective services of the deployed services to yield a traffic matrix (304) and, based on the traffic matrix, at a placement module, determining on which nodes within the multi-node network to place one or more applications (306). Determining the affinity can be performed at at least a first level and a second level. The first level can include an individual container or virtual machine level and the second level can include a service description level. The traffic matrix can include a weighted graph representing inter-service dependencies.

Application or service interdependency is valuable to optimal service placement in cloud deployments. The above disclosure introduces new concepts for detecting the inter-service communication by using a netflow telemetry and mapping the netflow telemetry to a weighted graph representing inter-service dependency. The graph can then be used in an optimization framework to provide better service placement. As suggested above, the present approach can involve a second phase of service or application placement. For example, a first service can be deployed on a first node, and a second service can be deployed on the second node within the network. The netflow telemetry of data flow between the first service and the second service can be evaluated so that the inter-service communication can be mapped to a weighted graph that represents the inter-service dependency. In an optimization context, if an evaluation determines based on a linear solver or other approach is disclosed above, that there is a strong level of affinity between the first service and the second service compared to other ongoing service-to-service communications, then a placement module containing or operating an optimization module can migrate, for example, the first service to the second node. The affinity can be detected based on the weighted traffic matrix extracted by the netflow module. The solver decides of its importance with respect to the other service-to-service flows. Alternately, the optimization module might migrate the second service from the second node to the first node.

When determining what a strong affinity means, the system can establish static thresholds which can indicate that when migration costs are taken into account, that improved performance will exist if one or more services are moved based on an evaluation. In one scenario, both services may be moved to a third node. Other factors that can be taken into account can include physical characteristics of nodes, operating systems or operating system characteristics relative to service characteristics, and so forth.

For historical or machine learning purposes, the system may also continue to detect inter-service communication after placement of services or after a migration. The system can evaluate the performance following service placement to determine whether a predicted or expected improvement in terms of inter-service communication was achieved based on the service placement. This data can be used to train machine learning models or to make adjustments to weights associated with the weighted graph representing inter-service dependency so as to further improve the evaluation process or to make adjustments regarding service placement. Thresholds may be adjusted based on such historical information as well.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any types of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options) where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

We claim:

1. A method comprising:
    evaluating, utilizing a netflow module within an orchestrator, flows coming in and out of deployed services within a multi-node network to yield an evaluation;
    based the evaluation, determining an affinity between respective services of the deployed services to yield a traffic matrix, wherein determining the affinity is performed at at least a first level and a second level, wherein the first level comprises an individual container or virtual machine level and the second level comprises a service description level; and based on the traffic matrix, at a placement module, determining on which nodes within the multi-node network to place one or more services.

2. The method of claim 1, wherein the traffic matrix comprises a weighted graph representing inter-service dependencies.

3. The method of claim 1, wherein determining on which nodes within the multi-node network to place one or more applications further comprises migrating a service after placement based on the evaluation.

4. The method of claim 1, further comprising placing a first service and a second service on a same node based on an evaluation that indicates a strong affinity between the first service and the second service.

5. The method of claim 1, wherein the placement module determines on which nodes within the multi-node network to place one or more services further based on usage metrics.

6. The method of claim 5, wherein the usage metrics comprise one or more of processor usage, memory usage and bandwidth data.

7. The method of claim 1, wherein the placement module further determines on which nodes within the multi-node network to place one or more services according to an application of one or more of a linear solver, a genetic algorithm, a machine learning algorithm, a predictive algorithm, and historical information.

8. A system comprising:

a processor; and a computer-readable device storing instructions which, when executed by the processor, cause the processor to perform operations comprising:

evaluating, utilizing a netflow module within an orchestrator, flows coming in and out of deployed services within a multi-node network to yield an evaluation;

based the evaluation, determining an affinity between respective services of the deployed services to yield a traffic matrix, wherein determining the affinity is performed at at least a first level and a second level, wherein the first level comprises an individual container or virtual machine level and the second level comprises a service description level; and based on the traffic matrix, at a placement module, determining on which nodes within the multi-node network to place one or more services.

9. The system of claim 8, wherein the traffic matrix comprises a weighted graph representing inter-service dependencies.

10. The system of claim 8, wherein determining on which nodes within the multi-node network to place one or more applications further comprises migrating a service after placement based on the evaluation.

11. The system of claim 8, wherein the computer-readable device stores additional instructions which, when executed by the processor, cause the processor to perform operations comprising:

placing a first service and a second service on a same node based on an evaluation that indicates a strong affinity between the first service and the second service.

12. The system of claim 8, wherein the placement module determines on which nodes within the multi-node network to place one or more services further based on usage metrics.

13. The system of claim 12, wherein the usage metrics comprise one or more of processor usage, memory usage and bandwidth data.

14. The system of claim 8, wherein the placement module further determines on which nodes within the multi-node network to place one or more services according to an application of one or more of a linear solver, a genetic algorithm, a machine learning algorithm, a predictive algorithm, and historical information.

15. A computer-readable device storing instructions which, when executed by a processor, cause the processor to perform operations comprising:

evaluating, utilizing a netflow module within an orchestrator, flows coming in and out of deployed services within a multi-node network to yield an evaluation;

based on the evaluation, determining an affinity between respective services of the deployed services to yield a traffic matrix, wherein determining the affinity is performed at at least a first level and a second level, wherein the first level comprises an individual container or virtual machine level and the second level comprises a service description level; and based on the traffic matrix, at a placement module, determining on which nodes within the multi-node network to place one or more services.

* * * * *